US 8,782,710 B2

(12) United States Patent
Fehr

(10) Patent No.: US 8,782,710 B2
(45) Date of Patent: Jul. 15, 2014

(54) METHOD AND SYSTEM FOR OPTIMIZING ELECTRONIC PROGRAM GUIDE DATA

(75) Inventor: Jacob Fehr, Calgary (CA)

(73) Assignee: Shaw Cablesystems G.P., Calgary, Alberta ( * ) Notice: Subject to any disclaimer, the term of this patent is extended or adjusted under 35 U.S.C. 154(b) by 40 days.

(21) Appl. No.: 13/221,183

(22) Filed: Aug. 30, 2011

(65) Prior Publication Data
US 2012/0054802 A1 Mar. 1, 2012

(30) Foreign Application Priority Data

Aug. 31, 2010 (CA) .................................... 2714061

(51) Int. Cl.
*G06F 3/00* (2006.01)
*G06F 13/00* (2006.01)
*H04N 5/445* (2011.01)

(52) U.S. Cl.
USPC ............................................. 725/54; 725/39

(58) Field of Classification Search
CPC ............ H04N 21/23109; H04N 21/84; H04N 21/8405; H04N 21/845
USPC .......................... 725/37, 38, 39, 44, 48, 52, 54
See application file for complete search history.

(56) References Cited

U.S. PATENT DOCUMENTS

| | | | |
|---|---|---|---|
| 6,584,153 B1 | 6/2003 | Gordon et al. | |
| 7,260,147 B2 | 8/2007 | Gordon et al. | |
| 7,433,406 B2 | 10/2008 | Bayrakeri et al. | |
| 7,516,140 B2 | 4/2009 | Garcea et al. | |
| 2002/0049972 A1 | 4/2002 | Kimoto | |
| 2004/0268394 A1* | 12/2004 | Nichols et al. | 725/45 |
| 2006/0256786 A1 | 11/2006 | Bibr et al. | |
| 2007/0294728 A1 | 12/2007 | Quere et al. | |
| 2008/0005766 A1* | 1/2008 | Ostrowska et al. | 725/53 |
| 2008/0244644 A1* | 10/2008 | McCausland | 725/37 |
| 2009/0125943 A1 | 5/2009 | White et al. | |
| 2010/0107196 A1* | 4/2010 | Kitayama | 725/46 |

FOREIGN PATENT DOCUMENTS

| | | |
|---|---|---|
| CA | 2370227 | 10/2000 |
| WO | 00/64164 | 10/2000 |

* cited by examiner

*Primary Examiner* — John Schnurr
(74) *Attorney, Agent, or Firm* — Bereskin & Parr LLP/S.E.N.C.R.L., s.r.l.; Paul Horbal

(57) ABSTRACT

Methods and systems of optimizing EPG data include: (i) receiving EPG data comprising a plurality of schedule objects; (ii) identifying a recurrence pattern in a subset of the schedule objects based on an association between properties of the schedule objects in the subset; (iii) based on the recurrence pattern, identifying at least one base schedule object in the subset, each at least one base schedule object comprising properties that are common to two or more of the schedule objects in the subset; (iv) generating at least one recurrence pattern property for identifying the recurrence pattern; (v) generating an optimized schedule grouping comprising the at least one base schedule object and a metadata object, wherein the metadata object comprises the at least one recurrence pattern property; and (vi) providing optimized EPG data in which the subset of schedule objects is substituted with the optimized schedule grouping.

27 Claims, 17 Drawing Sheets

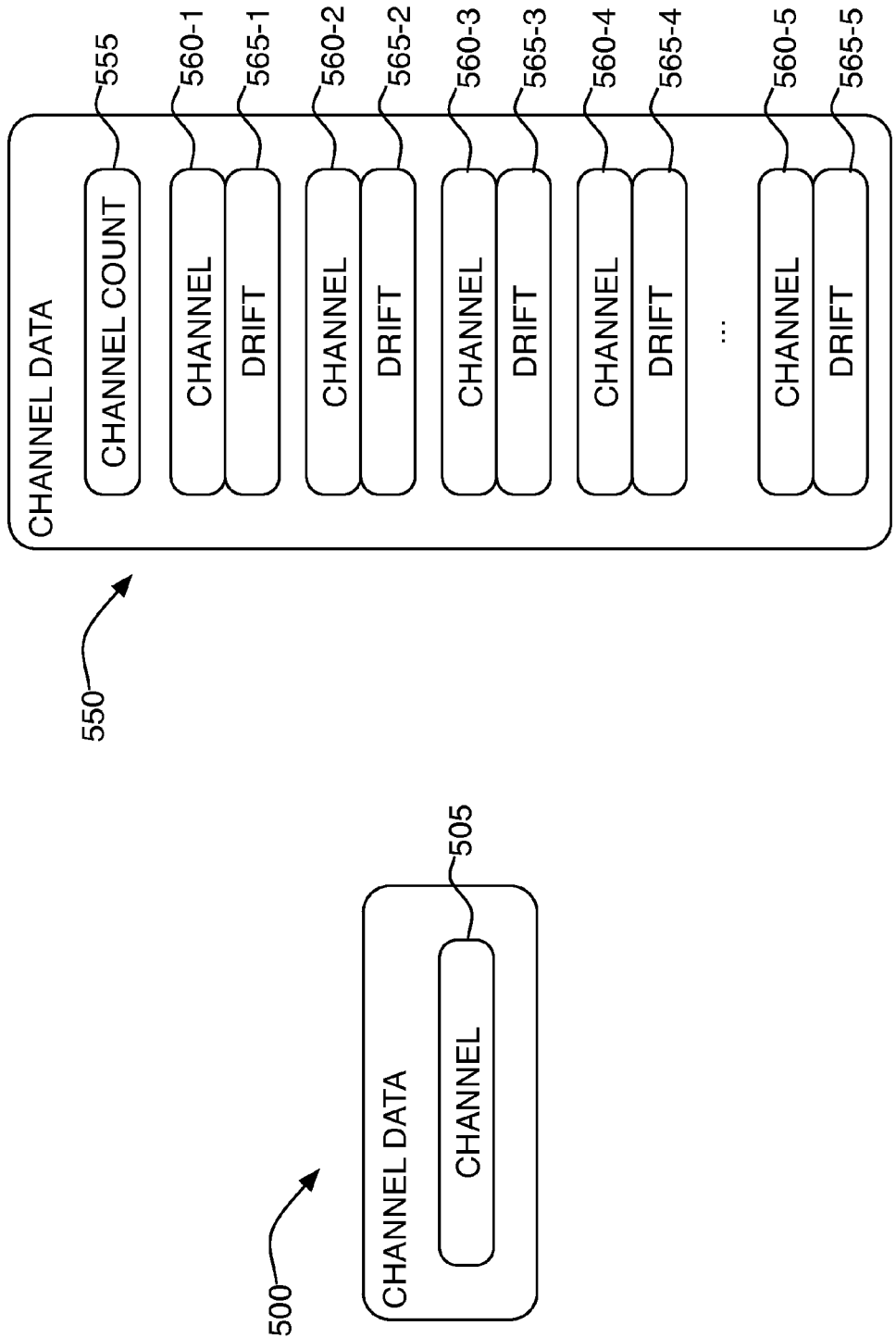

| 1410-1 | | 1412-1 | | 1414-1 | |
|---|---|---|---|---|---|
| CHANNEL | XBC-HAL | CHANNEL | XBC-MTL | CHANNEL | XBC-TOR |
| DATE | MAR 23 | DATE | MAR 23 | DATE | MAR 23 |
| TIME OF DAY | 10:00 | TIME OF DAY | 10:30 | TIME OF DAY | 10:30 |
| PROGRAM | Mock Tr... | PROGRAM | Mock Tr... | PROGRAM | Mock Tr... |
| ... | | ... | | ... | |

| 1410-2 | | 1412-2 | | 1414-2 | |
|---|---|---|---|---|---|
| CHANNEL | XBC-HAL | CHANNEL | XBC-MTL | CHANNEL | XBC-TOR |
| DATE | MAR 23 | DATE | MAR 23 | DATE | MAR 23 |
| TIME OF DAY | 10:30 | TIME OF DAY | 11:00 | TIME OF DAY | 11:00 |
| PROGRAM | Humorous.. | PROGRAM | Humorous.. | PROGRAM | Humorous.. |
| ... | | ... | | ... | |

| 1410-3 | | 1412-3 | | 1414-3 | |
|---|---|---|---|---|---|
| CHANNEL | XBC-HAL | CHANNEL | XBC-MTL | CHANNEL | XBC-TOR |
| DATE | MAR 23 | DATE | MAR 23 | DATE | MAR 23 |
| TIME OF DAY | 11:00 | TIME OF DAY | 11:30 | TIME OF DAY | 11:30 |
| PROGRAM | News | PROGRAM | News | PROGRAM | News |
| ... | | ... | | ... | |

FIG. 14

METHOD AND SYSTEM FOR OPTIMIZING ELECTRONIC PROGRAM GUIDE DATA

FIELD

The embodiments described herein relate to the field of electronic program guides and, in particular to methods and systems for organizing data in an electronic program guide.

INTRODUCTION

Electronic program guides are used widely in conjunction with a variety of media entertainment services, such as television, radio and other media services. Generally speaking, electronic program guides are accessible by users of the entertainment services and display scheduling information for current and upcoming programming. Electronic program guides may be periodically or continuously updated to ensure that the most up-to-date information is available upon demand.

In some cases, non-interactive electronic program guides may be provided, for example, on a cable television channel reserved for this purpose, to list current and upcoming programs on all channels in a scrolling list.

In some other cases, interactive electronic program guides may also be provided. An interactive guide enables a user of the service to navigate through scheduling information using an input device, such as a television remote control, to select and discover programming content. Content may be selected according to various criteria, including time, title, channel and genre. Data for generating an interactive electronic program guide data may be distributed to terminal devices, for example via a cable or satellite network.

SUMMARY

According to a first aspect of the invention, a method of optimizing EPG data is provided. The method comprises: (i) receiving the EPG data, wherein the EPG data comprises a plurality of schedule objects; (ii) identifying, using a processor, a recurrence pattern in a subset of the schedule objects, wherein the recurrence pattern is based on an association between one or more properties of two or more of the schedule objects in the subset; (iii) based on the recurrence pattern, identifying at least one base schedule object in the subset of schedule objects, wherein the at least one base schedule object comprises properties that are common to two or more of the schedule objects in the subset; (iv) generating at least one recurrence pattern property for identifying the recurrence pattern; (v) generating an optimized schedule grouping comprising the at least one base schedule object and a metadata object, wherein the metadata object comprises the at least one recurrence pattern property; and (vi) providing optimized EPG data in which the subset of schedule objects is substituted with the optimized schedule grouping.

According to a second aspect of the invention, an EPG data optimization system is provided. The system comprises: (i) a communication interface for receiving the EPG data, wherein the EPG data comprises a plurality of schedule objects; (ii) a memory for storing the EPG data; and (iii) a processor. The processor is configured to: (i) receive the EPG data, wherein the EPG data comprises a plurality of schedule objects; (ii) identify, using a processor, a recurrence pattern in a subset of the schedule objects, wherein the recurrence pattern is based on an association between one or more properties of two or more of the schedule objects in the subset; (iii) based on the recurrence pattern, identify at least one base schedule object in the subset of schedule objects, wherein the at least one base schedule object comprises properties that are common to two or more of the schedule objects in the subset; (iv) generate at least one recurrence pattern property for identifying the recurrence pattern; (v) generate an optimized schedule grouping comprising the at least one base schedule object and a metadata object, wherein the metadata object comprises the at least one recurrence pattern property; and (vi) provide optimized EPG data in which the subset of schedule objects is substituted with the optimized schedule grouping.

According to a third aspect of the invention, a computer-readable medium is provided having stored thereon instructions executable by a computer processor. The instructions, when executed, cause the computer to perform the method comprising: (i) receiving the EPG data, wherein the EPG data comprises a plurality of schedule objects; (ii) identifying, using a processor, a recurrence pattern in a subset of the schedule objects, wherein the recurrence pattern is based on an association between one or more properties of two or more of the schedule objects in the subset; (iii) based on the recurrence pattern, identifying at least one base schedule object in the subset of schedule objects, wherein the at least one base schedule object comprises properties that are common to two or more of the schedule objects in the subset; (iv) generating at least one recurrence pattern property for identifying the recurrence pattern; (v) generating an optimized schedule grouping comprising the at least one base schedule object and a metadata object, wherein the metadata object comprises the at least one recurrence pattern property; and (vi) providing optimized EPG data in which the subset of schedule objects is substituted with the optimized schedule grouping.

DRAWINGS

For a better understanding of embodiments of the systems and methods described herein, and to show more clearly how they may be carried into effect, reference will be made, by way of example, to the accompanying drawings in which:

FIG. 5 illustrates two examples of channel data;

FIG. 14 illustrates example schedule items corresponding to the schedule excerpt of FIG. 13;

Figure 1:
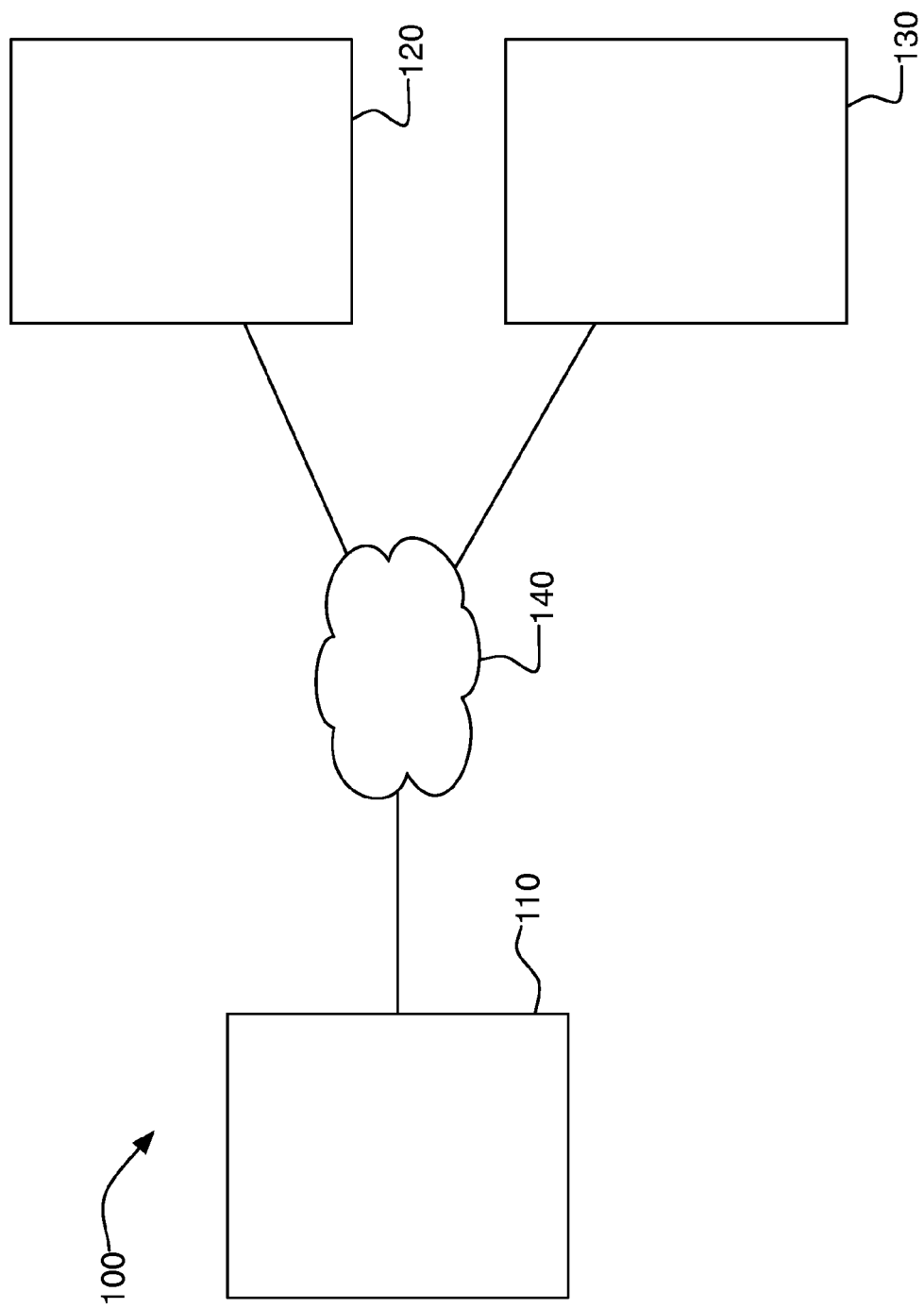
FIG. 1 illustrates a simplified block diagram of a media service with an electronic program guide (EPG) capability.

The skilled person in the art will understand that the drawings, described below, are for illustration purposes only. The drawings are not intended to limit the scope of the applicants' teachings in any way. Further, where considered appropriate, reference numerals may be repeated among the figures to indicate corresponding or analogous elements.

DESCRIPTION OF VARIOUS EMBODIMENTS

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), and at least one communication interface. For example and without limitation, the programmable computers may be a server, network appliance, set-top box, embedded device, computer expansion module, personal computer, laptop, personal data assistant, or mobile device. Program code is applied to input data to perform the functions described herein and generate output information. The output information is applied to one or more output devices, in known fashion. In some embodiments, the communication interface may be a network communication interface. In embodiments where elements of the invention are combined, the communication interface may be a software communication interface, such as those for inter-process communication (IPC). In still other embodiments, there may be a combination of communication interfaces.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and pre-defined manner to perform the functions described herein.

Furthermore, the system, processes and methods of the described embodiments are capable of being distributed in a computer program product comprising a non-transitory computer readable medium that bears computer useable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Referring now to FIG. 1, there is shown a simplified block diagram of a media service with an electronic program guide (EPG) capability.

A media service provider can provide media content from a content server 120. Media content may include video content, such as television programs, music videos and movies. Media content may also include audio content, such as music or talk radio. For example, media service provider may be a cable television provider and content server 120 may store and transmit a plurality of television programs on a plurality of channels, in accordance with a programming schedule. Media service provider may also be a satellite television provider, a digital radio provider, an Internet service provider and the like.

An electronic program guide containing schedule information may be provided by EPG server 130. EPG server 130 may be provided by the media service provider directly, in which case the functionality of EPG server 130 may be merged with content server 120. In some cases, EPG server 130 may be provided by a third party, in which case the media service provider may communicate program schedule data to the third party to enable provision of EPG data.

Terminal device 110 can be connected to content server 120 and, if necessary, EPG server 130 via a communications network 140. Communications network 140 may be any suitable network for delivering media content. Examples of communications networks 140 include a cable network, fibre optic network, digital subscriber line (DSL) or telephone network, satellite network, the Internet and a broadcast network (e.g., television or radio). In some cases, the network may be a direct connection to content server 120 and/or EPG server 130.

Terminal device 110 may be a computing device configured to receive EPG data from EPG server 130 and generate an interactive EPG for display to a user. For example, terminal device 110 may be a digital set-top box, a personal video recorder, a personal computer, a personal digital assistant, a smartphone, a digital radio or a digital television with an EPG function. In the case of a non-interactive EPG, terminal device 110 may be a simple device capable of displaying an EPG, such as a television, and the non-interactive EPG may be generated by EPG server 130 or content server 120.

For the purposes of illustration, reference will be made herein to an electronic program guide for a satellite television service. However, it will be appreciated that the concepts described herein are equally applicable to media content delivered via other services.

Figure 2:
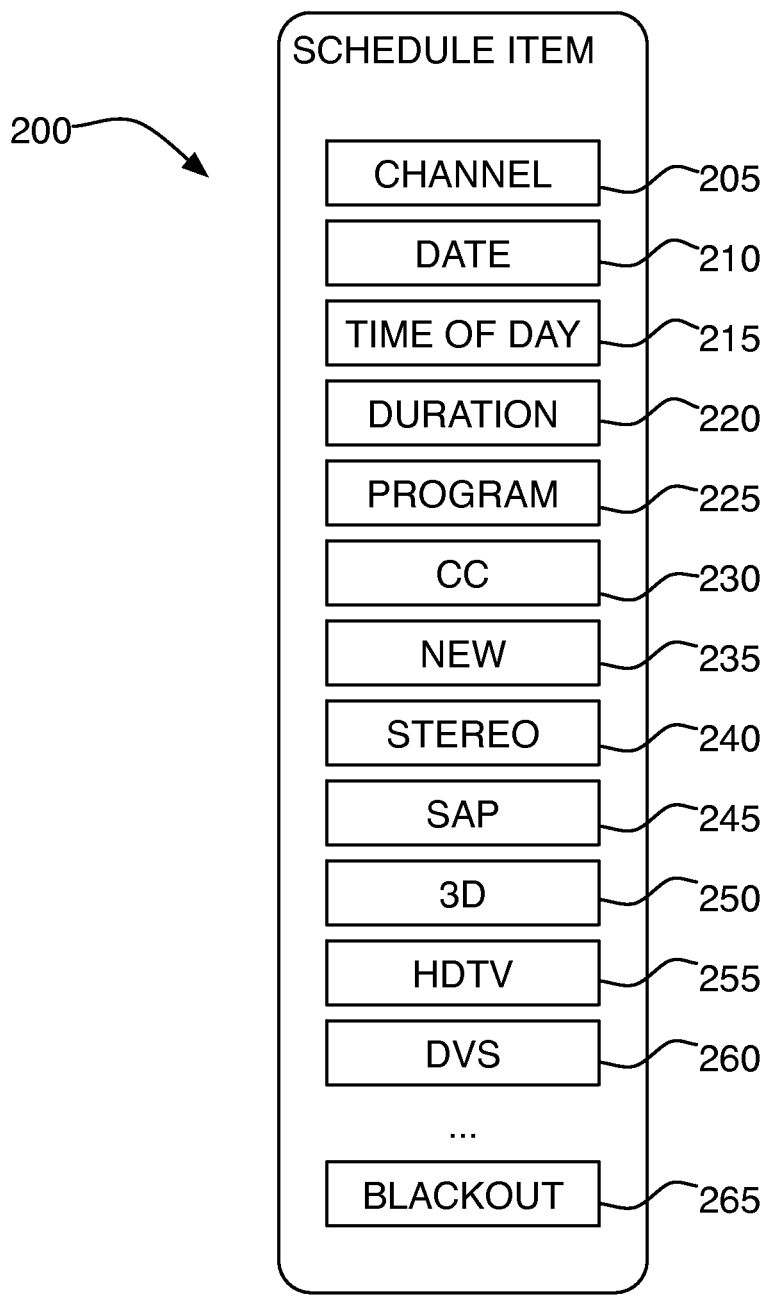
FIG. 2 illustrates an example schedule item of EPG data.

Referring now to FIG. 2, there is shown an example schedule item of EPG data. EPG data may be provided in a variety of formats such as, for example, a machine-readable structured markup language, such as Extensible Markup Language (XML). A base unit of EPG data may be a schedule item 200, for describing information related to a schedule entry for a particular program. Each schedule item may comprise one or more properties, which may be tagged using suitable markup.

In some cases, EPG data may be delivered in tabular form, such as comma-separated value or the like. Any other suitable data formats may also be used.

For each program entry in the schedule, schedule item 200 may comprise a channel property 205 for identifying the channel, a date property 210 for identifying the date of the program, a time of day property 215 for identifying the time of day of the program, a duration property 220 for identifying the duration of the program, a program property 225 for identifying the title or identifier of the program, a closed captioning property 230 for identifying whether the program supports closed captioning, a new property 235 for identifying whether the program has previously aired, a stereo property 240 for identifying whether the program audio is offered in stereo, a second audio program property 245 for identifying whether a second audio program is offered, a 3D property 250 for identifying whether the program is offered in 3D, an HDTV property 255 for identifying whether the program is offered in high definition, a descriptive video service property 260 for identifying whether the program offers video description for visually impaired users, and a blackout property 265 for identifying areas in which the program is unavailable for broadcast (e.g., due to broadcast restrictions). Properties may be added or omitted as necessary, depending on the services offered by the media service provider.

Figure 3:
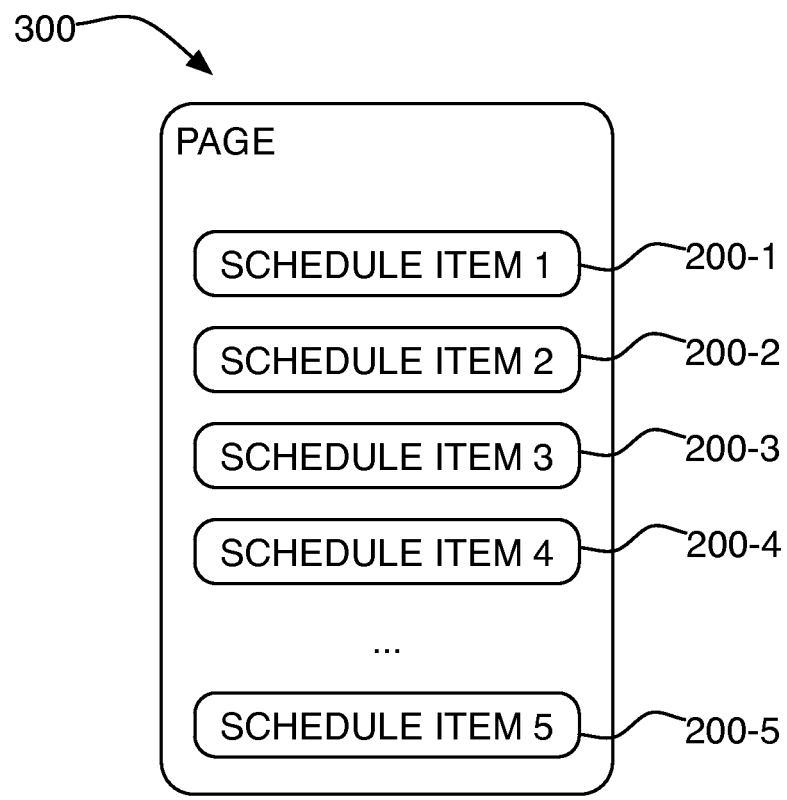
FIG. 3 illustrates an example schedule item grouping.

Referring now to FIG. 3, there is shown an example schedule item grouping. In some cases, multiple items of EPG data, such as schedule item 200, may be grouped into a schedule page 300. Items grouped in a page may be associated with each other. For example, each of the items in the page may be associated in time or by channel. When transmitting EPG data, EPG server 130 may transmit one page at a time, based on user requirements or a predetermined algorithm.

In one example, EPG server 130 may receive fourteen days of EPG data from a media service provider or other source. The EPG data may comprise schedule items such as schedule item 200 in a flat file format. Accordingly, given a large number of channels and the large time range, the EPG data file may require significant bandwidth to deliver. In some cases, such as with satellite transmission, the bandwidth available to deliver EPG data may be constrained. Various known file compression techniques, such as Lempel-Ziv-Welch (LZW) compression may be used to reduce the size of the file to be transmitted. However, due to the nature of the file compression, changes to the EPG data may require retransmitting the entire compressed file, which may be inefficient and costly.

Changes to EPG data can be quite common. The further into the future that EPG data extends, the more likely it becomes that EPG data will need to be changed. Accordingly, in order to avoid having to transmit and retransmit a large EPG data file, thus using a large amount of bandwidth, some media service providers may discard EPG data beyond a certain time. For example, despite having EPG data for fourteen days of programming, the media service provider may only provide three days of EPG data via EPG server 130, to limit the bandwidth required to deliver the data and update it, if necessary.

EPG data may comprise a large amount of redundant data. In a first example, a television program, such as a syndicated program, may be repeated at the same time each day several times a week.

In another example, a single television program may be provided on multiple channels. The program may be provided on the same day and at the same time, or the program may be at different times, for example due to time zone differences. For example, if the media service provider offers several channels corresponding to local affiliates of the same network, the same programs may be aired either at the same time (if the affiliates are in the same time zone) or at different times (if the affiliates are in different time zones).

In yet another example, a single television program may be repeated at set intervals. For example, a pay-per-view channel may provide the same program, such as a movie, every two hours. The program may air continuously in a "back-to-back" fashion, or it may be interleaved with one or more other programs.

Each of these redundancies illustrates a recurrence pattern based on an association between one or more properties of the program schedule items. Each recurrence pattern may occur alone or in combination with other recurrence patterns. Nevertheless, each program may retain its own schedule item, leading to a large amount of redundant or repeated data.

Conventional file compression techniques, such as LZW, are capable of eliminating redundancies that occur in the form of repeated character strings. However, LZW and other techniques may fail to identify the underlying recurrence patterns that give rise to such redundancies, such as the examples described herein. Moreover, conventional file compression techniques, when applied to EPG data, may produce output that cannot easily be subdivided or concatenated while still providing useable data.

A number of optimizations to the EPG data can be applied based on the recurrence patterns, which have the effect of reducing or eliminating redundancies. A recurrence pattern property can be used to identify the underlying recurrence pattern and enable a device receiving the optimized EPG data to reconstruct the original schedule. As a result of the optimizations, a more streamlined EPG data file can be provided that requires less bandwidth, or that may contain more information for a given bandwidth. In particular, recurrence patterns that may be identified and optimized include: 1) re-occurrences of the same program at the same time on different days ("repeat days"); 2) repetition of the same program on the same channel at set intervals ("repeat runs"); and 3) re-occurrences of the same program on different channels, either at the same time or at different times ("repeat channels").

Recurrence pattern properties may be provided as additional metadata or properties in either the optimized schedule item or the optimized schedule page, depending on the nature of the optimization.

Figure 4A:
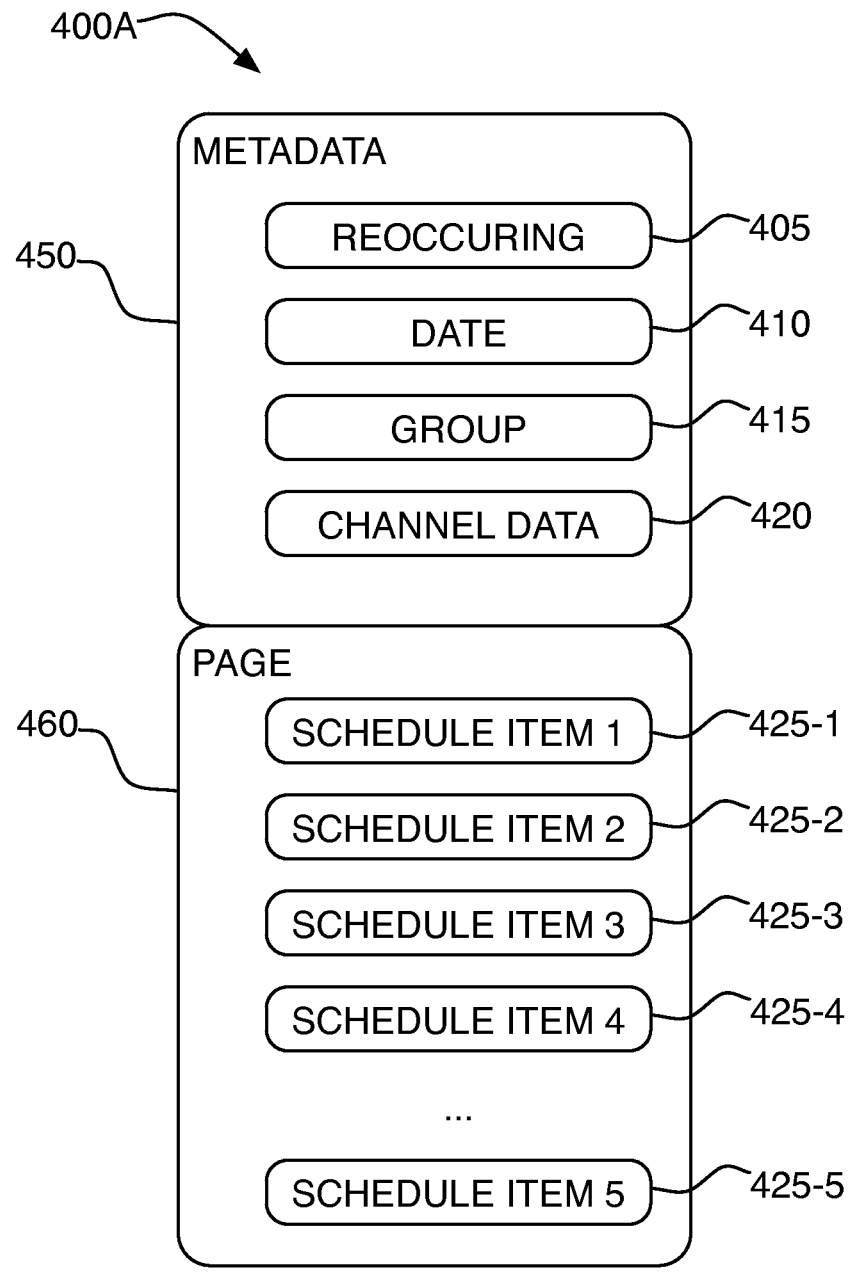
FIG. 4A illustrates an example schedule page with appended metadata.
Figure 4B:
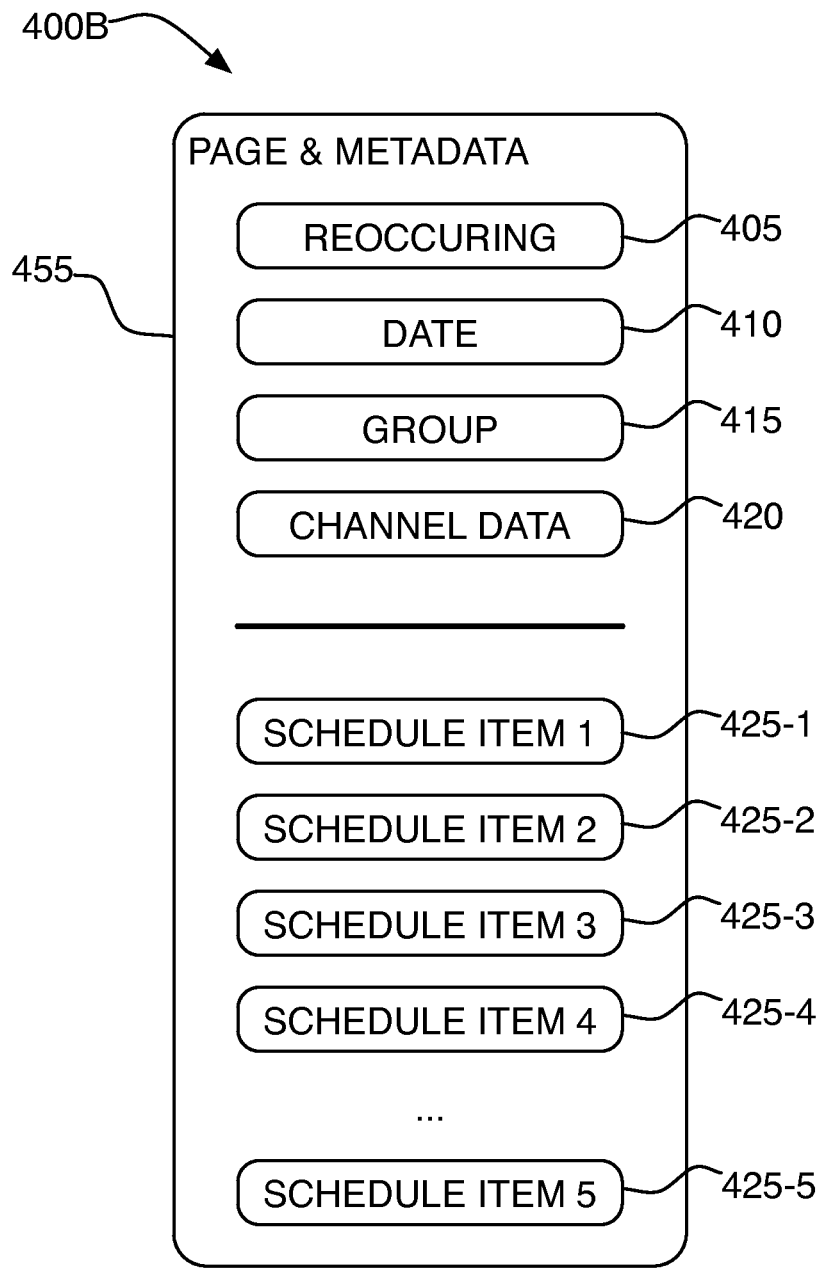
FIG. 4B illustrates an example schedule page with integrated metadata.

Referring now to FIG. 4A, there shown an example schedule page with appended metadata. Schedule page 460 may comprise schedule items 425-1 to 425-5. For the purposes of illustration, only five schedule items are shown, however fewer or more schedule items may be included depending on the number of schedule items being optimized. In some cases, schedule items 425-1 through 425-5 may share a common characteristic or a recurring pattern. Accordingly, metadata properties, such as metadata properties 405, 410, 415 and 420, may be provided in metadata 450. Metadata 450 may be provided separately or in conjunction with schedule page 460. In some cases, metadata and schedule items may be incorporated in a combined schedule page and metadata item 455, such as that shown in FIG. 4B. Metadata 450 or 455 may take the form of a header associated with the schedule page.

Reoccurrence metadata property 405 may be used, for example, when a "repeat days" recurrence pattern is detected, indicating that schedule items 425-1 through 425-5 reoccur on specified days. In some cases, reoccurrence property 405 may simply be a flag indicating that each associated schedule item contains a property identifying the days of the week on which that schedule item reoccurs. In other cases, reoccurrence property 405 may directly specify the days of the week on which the associated schedule items reoccur.

Date metadata property 410 may indicate a date associated with each of schedule items 425-1 through 425-5. Although not shown, additional metadata properties may be provided to further reduce redundancies, where other common properties exist among schedule items 425-1 through 425-5. For example, if each of the schedule items 425-1 through 425-5 is provided with closed captioning, a closed captioning metadata property may be provided and the equivalent property can be omitted or removed from each schedule item in the page.

Group metadata property 415 may be used, for example, when a "repeat channels" recurrence pattern is detected, indicating that schedule items 425-1 through 425-5 reappear on multiple channels. Accordingly, group metadata property 415 may specify that additional channel data, such as channel data 420, may be provided to specify the channels on which the associated schedule items will appear. In some cases, group metadata property 415 may be omitted or integrated with channel data 420. Channel data is described herein with reference to FIG. 5.

Referring now to FIG. 5, there are shown two examples of channel data. Channel data 500 comprises a single channel identifier 505. Channel data 500 may be used, for example, when each of the schedule items in a schedule page share a common channel. In such cases, a group metadata property, if present, may indicate that only a single channel is to be used.

If the schedule items contained in a page are repeated on different channels, as may be indicated by group metadata property 415, channel data 550 may be provided. Channel data 550 may comprise channel identifiers 560-1 through 560-5 and drift or time offset properties 565-1 through 565-5, associated with each of channel identifiers 560-1 through 560-5, respectively. When optimized EPG data is used to generate a schedule, the time offset may be added to the time of day to obtain the actual start time for the item. For the purposes of illustration, only five channel identifiers and time offset properties are shown, however fewer or more may be included depending on the number of schedule items being optimized. Channel data 550 may further comprise a channel count 555, which indicates the number of channel identifiers contained in the channel data 550.

Figure 6:
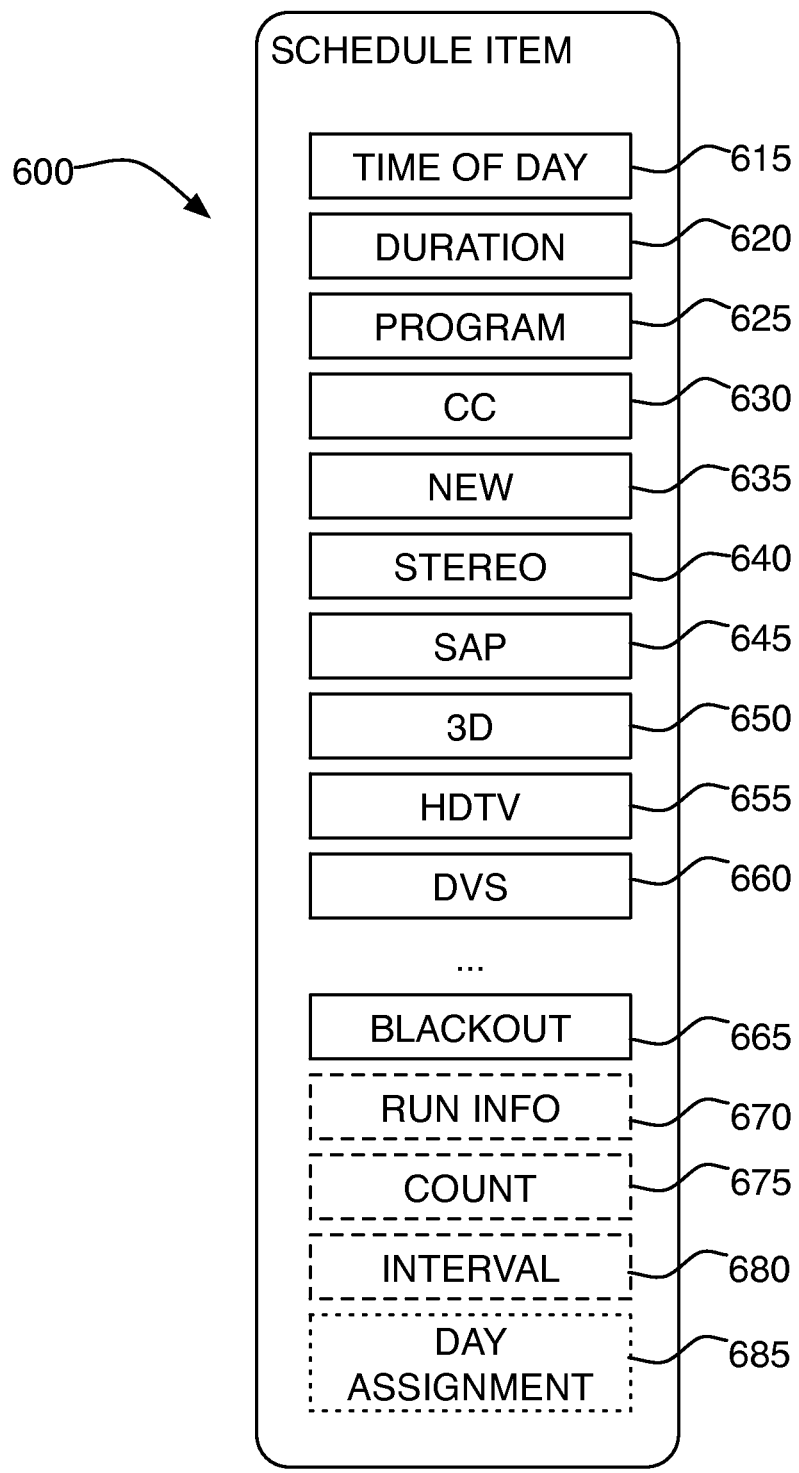
FIG. 6 illustrates an exemplary optimized schedule item.

Referring now to FIG. 6, there is shown an exemplary optimized schedule item. Optimized schedule items may comprise properties corresponding to those of schedule item 200. However, optimized schedule item 600 may omit certain properties, such as channel property 205, date property 210 and the like. Accordingly, optimized schedule item 600 may comprise a time of day property 615 for identifying the time of day of the program, a duration property 620 for identifying the duration of the program, a program property 625 for identifying the title or identifier of the program, a closed captioning property 630 for identifying whether the program supports closed captioning, a new property 635 for identifying whether the program has previously aired, a stereo property 640 for identifying whether the program audio is offered in stereo, a second audio program property 645 for identifying whether a second audio program is offered, a 3D property 650 for identifying whether the program is offered in 3D, an HDTV property 655 for identifying whether the program is offered in high definition, a descriptive video service property 660 for identifying whether the program offers video description for visually impaired users, and a blackout property 665 for identifying areas in which the program is unavailable for broadcast (e.g., due to broadcast restrictions). Properties may be added or omitted as necessary, depending on the services offered by the media service provider.

In addition, optimized schedule item 600 may provide additional metadata properties. For example, a run info property 670 may be provided, for example, when a "repeat runs" recurrent pattern is detected, for identifying that the optimized schedule item may be repeated at set intervals. Run info property 670 may indicate that a count property 675, for identifying the number of times to repeat the optimized schedule item, will also be provided. Likewise, run info property 670 may indicate that an interval property 680, for identifying the interval at which to repeat the optimized schedule item, will also be provided. In some cases, run info property 670 may be omitted and the presence of count property 675 or interval property 680 may be used to infer that the optimized schedule item is to be repeated.

In another example, day assignment property 685 may be provided when the optimized schedule item is to be repeated on multiple days of the week. Accordingly, day assignment property 685 may contain an indication of the days of the week on which to repeat the optimized schedule item. Day assignment property 685 may be provided in conjunction with a reoccurrence property 405 that is associated with the page containing the optimized schedule item.

Optimization techniques described herein will now be described by way of example with reference to FIGS. 7 to 15.

Figure 7:
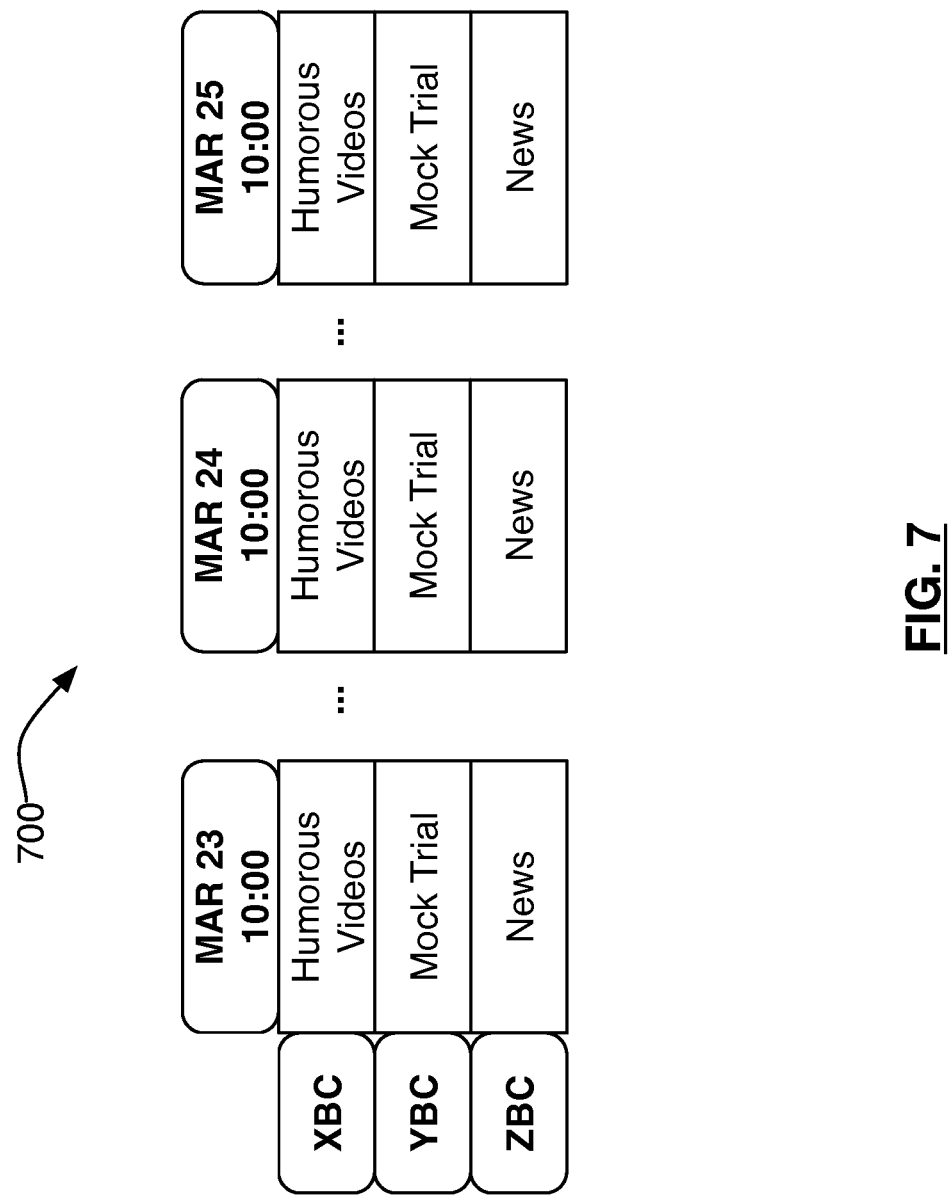
FIG. 7 illustrates an example schedule excerpt containing a repeat days recurrence pattern.

Referring now to FIG. 7, there is shown an example schedule excerpt containing a repeat days recurrence pattern. Schedule excerpt 700 is a fragment of EPG data describing the program schedule for three channels (XBC, YBC and ZBC) at a time of 10:00 on three different days (March 23, 24 and 25). Each channel airs a particular program at the same time on each consecutive day. For example, the XBC channel airs the program "Humorous Videos" during this time slot.

Figure 8:
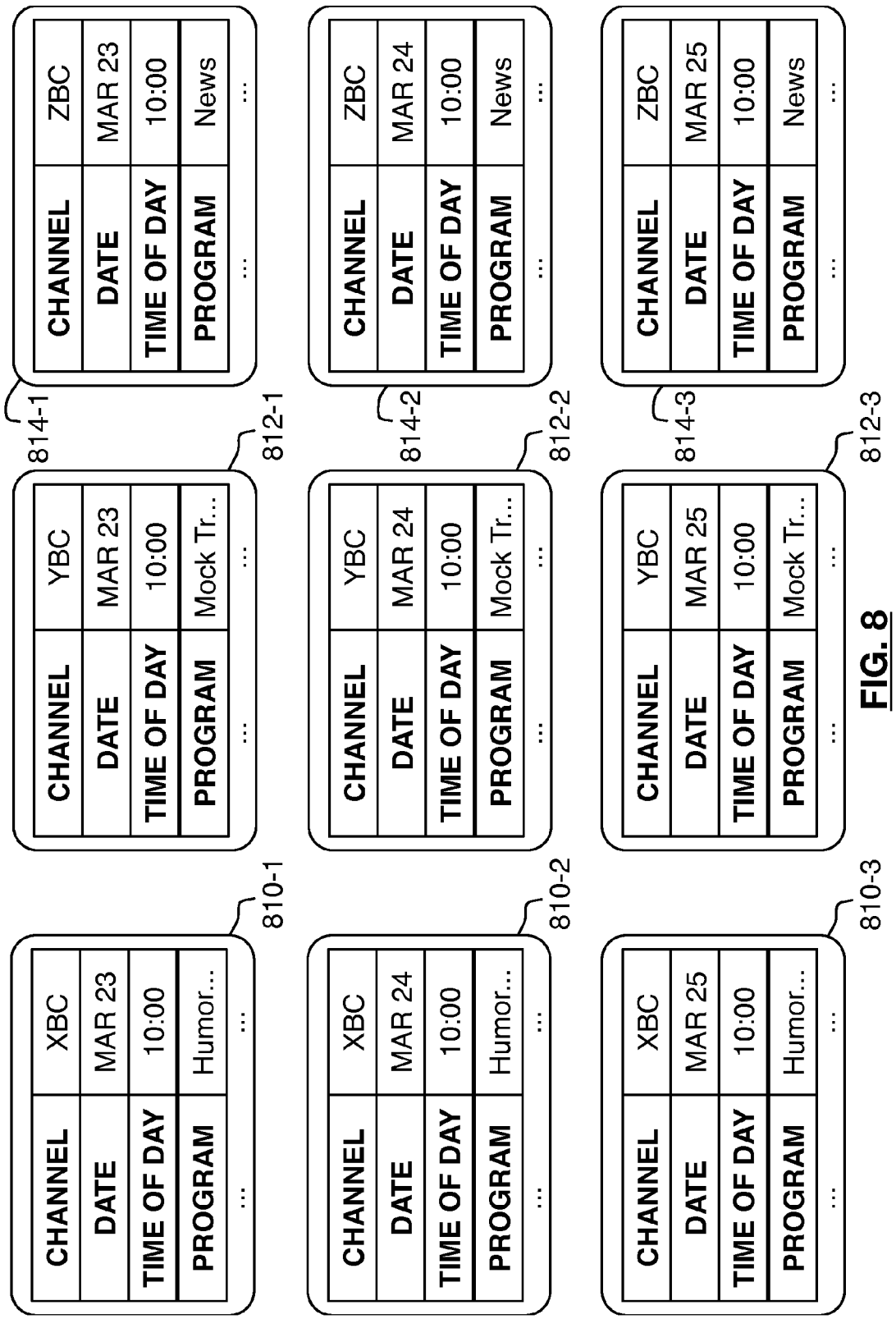
FIG. 8 illustrates example schedule items corresponding to the schedule excerpt of FIG. 7.

Referring now to FIG. 8, there are shown example schedule items corresponding to the schedule excerpt of FIG. 7. The schedule items may be excerpts of EPG data. Schedule items 810-1, 810-2 and 810-3 correspond to the timeslots for the XBC channel; schedule items 812-1, 812-2 and 812-3 correspond to the timeslots for the YBC channel; and schedule items 814-1, 814-2 and 814-3 correspond to the timeslots for the ZBC channel.

For example, schedule item 810-1 has properties indicating that the item is associated with: the XBC channel, the date of March 23, the time of day of 10:00 and the program "Humorous Videos". Additional properties (not shown) may also be present. Each of the remaining schedule items has similar properties corresponding to the program, channel, day and timeslot.

In some cases, the schedule items may be grouped into pages (not shown). For example, items 810-1, 810-2 and 810-3 may be grouped into a page.

Considerable redundancies exist in the schedule item properties. For example, each channel property and program property is repeated three times.

Figure 9:
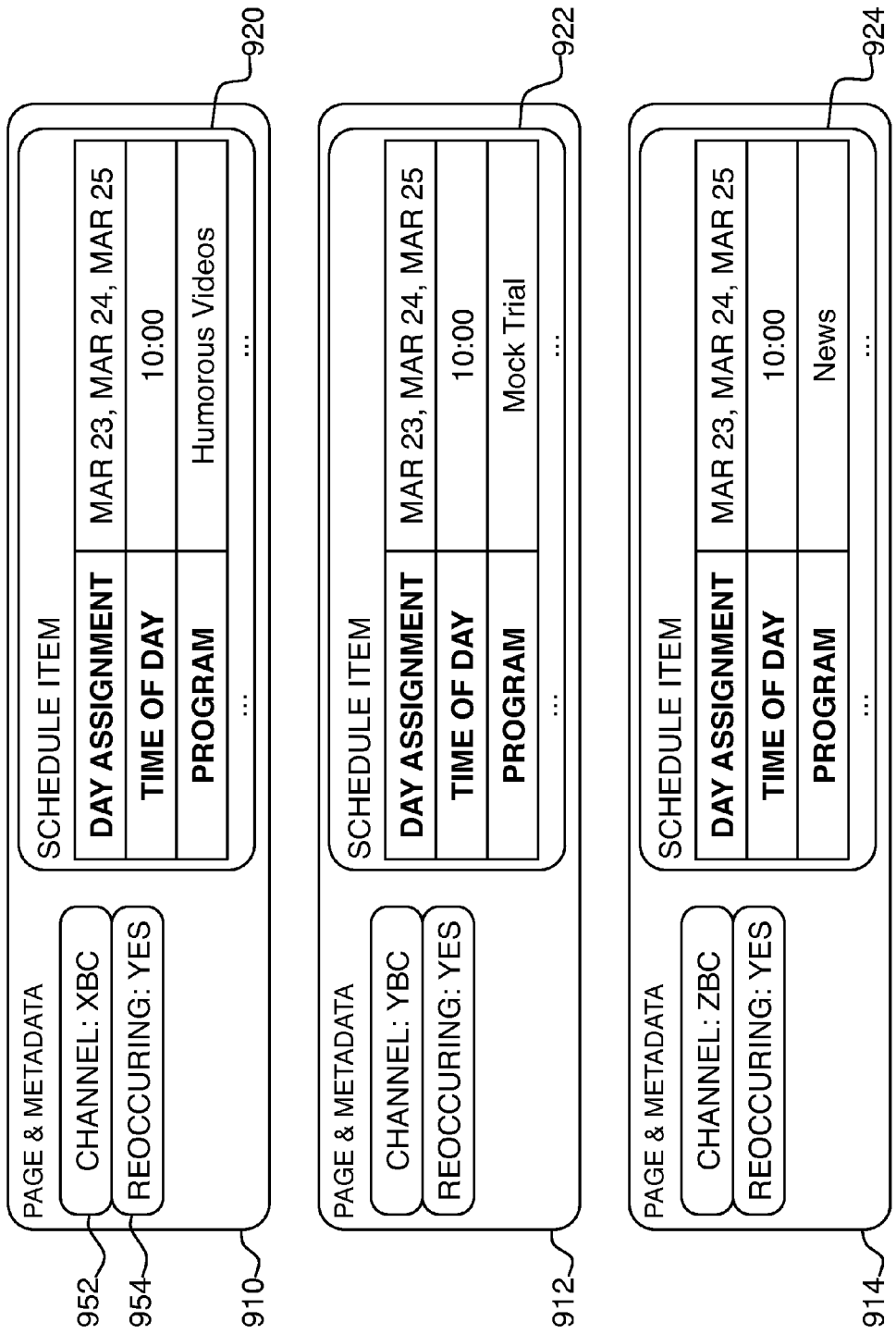
FIG. 9 illustrates example optimized schedule pages corresponding to the schedule items of FIG. 8.

Referring now to FIG. 9, there are shown example optimized schedule pages corresponding to the schedule items of FIG. 8. Redundancies in schedule item properties have been identified and removed, while additional metadata properties have been added to facilitate generating complete schedule information.

Optimized schedule pages 910, 912 and 914 each comprise one optimized schedule item 920, 922 and 924, respectively. For example, optimized schedule page 910 comprises optimized schedule item 920 and additional metadata including channel data 952 and reoccurrence property 954. Channel data 952 indicates that the channel to be used for schedule item 920 is XBC. Reoccurrence property 954 indicates that schedule item 920 contains a day assignment property.

Optimized schedule item 920 comprises a day assignment property indicating that the schedule item is repeated on March 23, 24 and 25. In some cases, the day assignment property may be provided as simply a day of the week (e.g., Monday, Tuesday, Wednesday, etc.) or using other suitable notation. Optimized schedule item 920 further comprises a time of day property indicating that the item occurs at 10:00 and a program property indicating that the program name is "Humorous Videos".

Similarly, optimized schedule pages 912 and 914 contain similar information relating to their respective programs and channels.

Accordingly, the number of schedule items required to reproduce EPG data equivalent to that shown in FIG. 7 has been reduced from nine to three.

Figure 10:
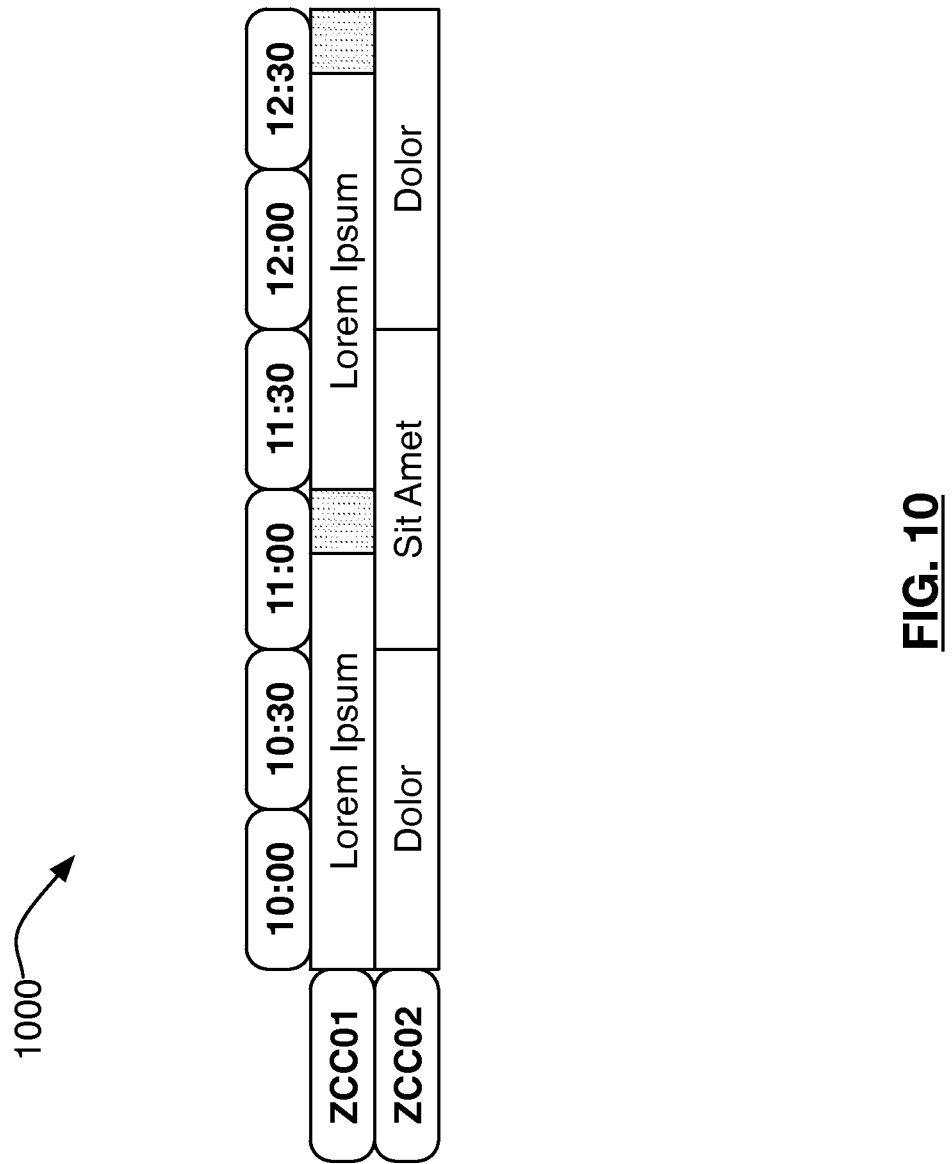
FIG. 10 illustrates an example schedule excerpt containing a repeat runs recurrence pattern.

Referring now to FIG. 10, there is shown a example schedule excerpt containing a repeat runs recurrence pattern. Schedule excerpt 1000 is a fragment of EPG data describing the program schedule for two channels (ZCC01 and ZCC02) between the times of 10:00 and 13:00 on a single day. ZCC01 airs the program "Lorem Ipsum" twice in succession with a short interval in between. ZCC02 airs the program "Dolor" twice, with the program "Sit Amet" in between.

Figure 11:
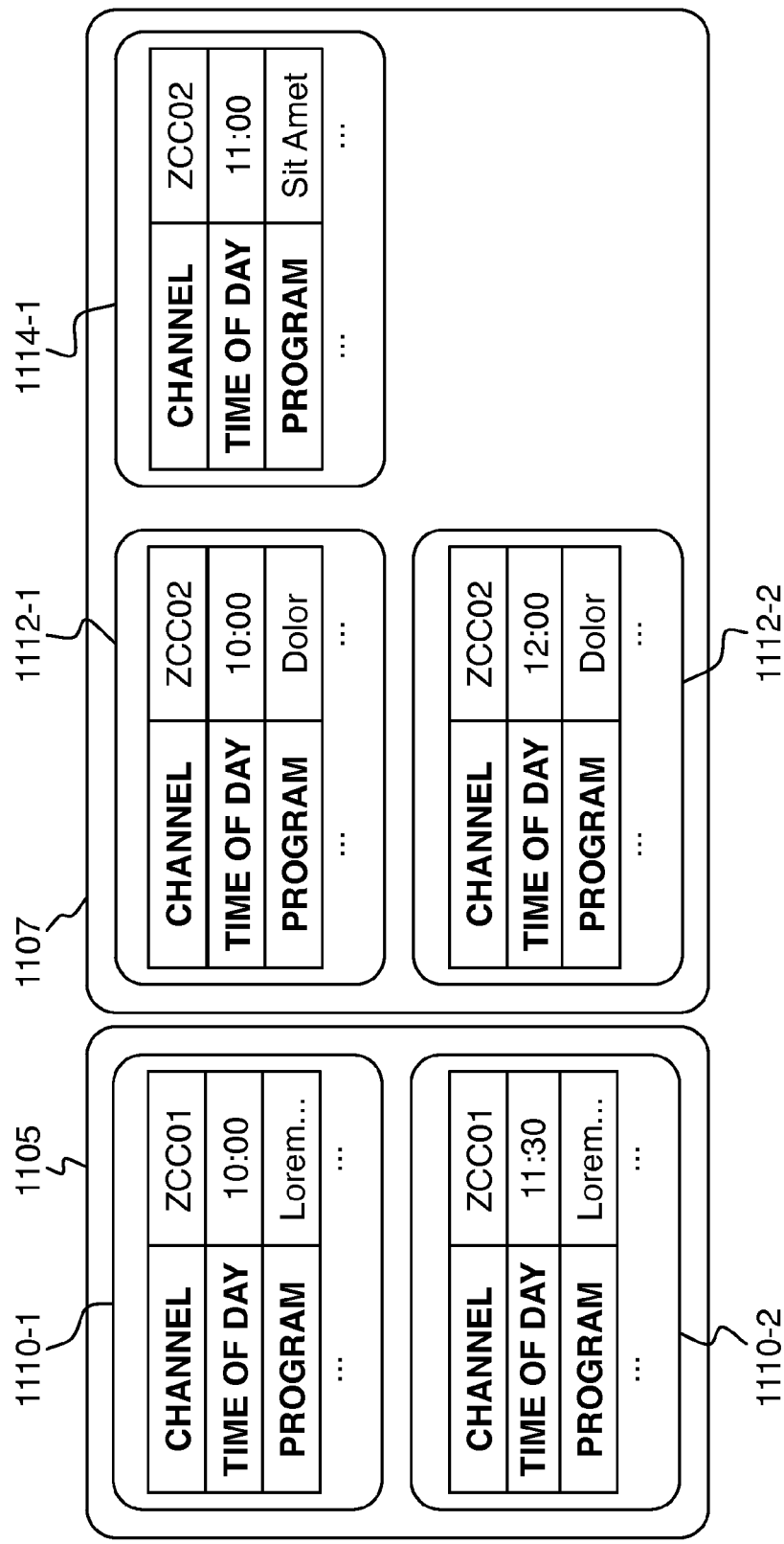
FIG. 11 illustrates example schedule items corresponding to the schedule excerpt of FIG. 10.

Referring now to FIG. 11, there are shown example schedule items corresponding to the schedule excerpt of FIG. 10. The schedule items may be excerpts of EPG data. Schedule items 1110-1 and 1110-2 are grouped into page 1105, whereas schedule items 1112-1, 1112-2 and 1114-1 are grouped into page 1107. Schedule items 1110-1 and 1110-2 correspond to each of the programs airing on channel ZCC01, whereas schedule items 1112-1, 1112-2 and 1114-1 correspond to the programs airing on channel ZCC02.

For example, schedule item 1110-1 has properties indicating that the item is associated with: the ZCC01 channel, the time of day of 10:00 and the program "Lorem Ipsum". Additional properties (not shown) may also be present. Each of the remaining schedule items has similar properties corresponding to the program, channel, day and timeslot.

In some cases, the schedule items may not be grouped into pages or may be grouped into a single page (not shown).

Considerable redundancies exist in the schedule item properties. For example, each schedule item relating to the program "Lorem Ipsum" may contain identical properties with the exception of the time of day property.

Figure 12:
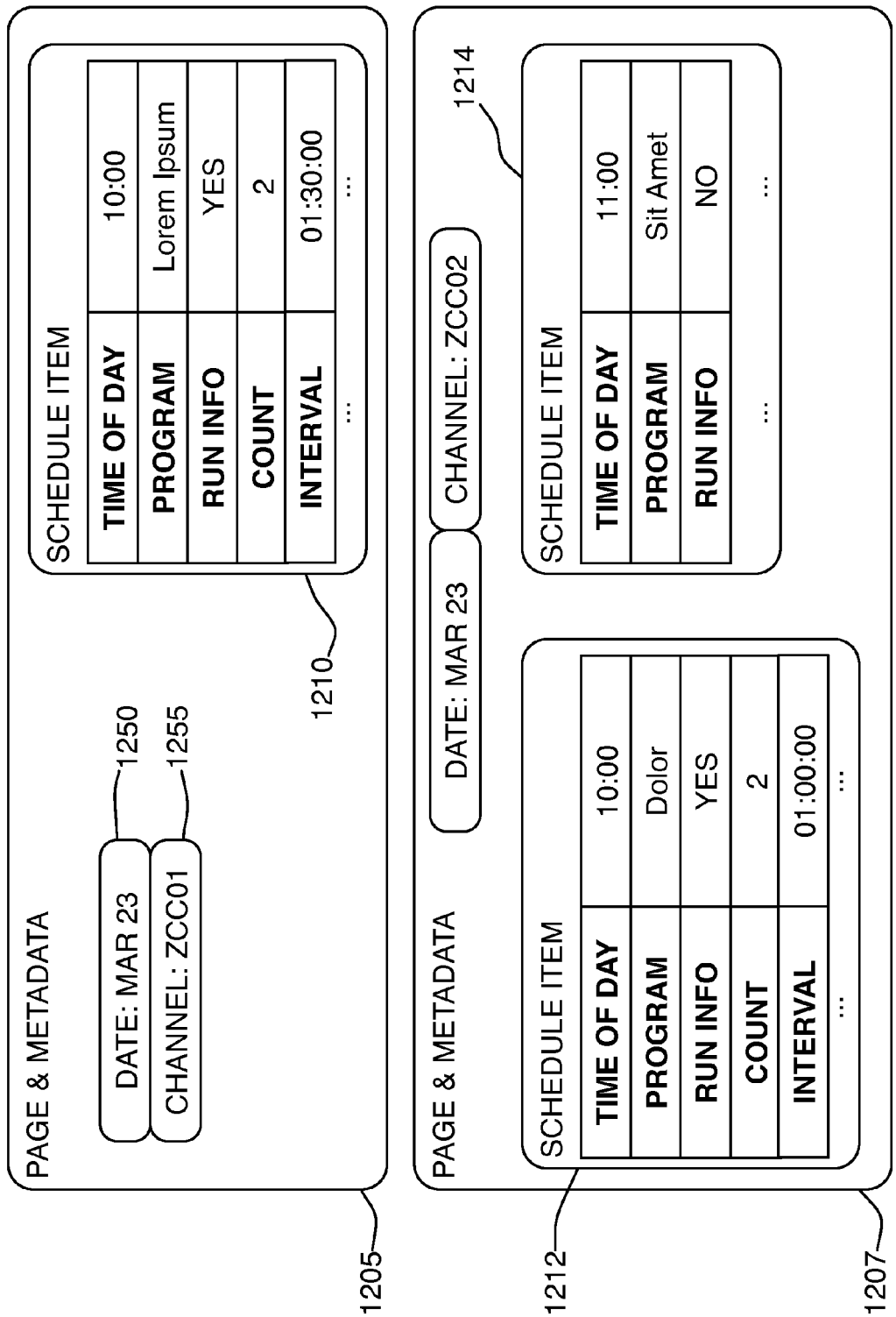
FIG. 12 illustrates example optimized schedule pages corresponding to the schedule items of FIG. 11.

Referring now to FIG. 12, there are shown example optimized schedule pages corresponding to the schedule items of FIG. 11. Redundancies in schedule item properties have been identified and removed, while additional metadata properties have been added to facilitate generating complete schedule information.

Optimized schedule page 1205 comprises one optimized schedule item 1210. Optimized schedule page 1207 comprises two optimized schedule items 1212 and 1214. Each optimized schedule page further comprises metadata properties representing data common to the schedule items contained in the page. For example, optimized schedule page 1205 comprises a date property 1250 and a channel property 1255.

Optimized schedule item 1210 comprises a time of day property for indicating the first start time of the program and a program property identifying the program. In addition, a run info property is provided indicating that a count property and an interval property are also present. The count property indicates that the program is to be repeated two times. The interval property indicates that the program is to be repeated every one hour and thirty minutes. It will be appreciated that the interval property need not be the same as the actual duration of the program.

Optimized schedule page 1207 contains two optimized schedule items 1212 and 1214, relating to two different programs. Optimized schedule item 1212 relates to a program that is repeated in similar fashion to optimized schedule item 1210. However, optimized schedule item 1214 is not repeated. Due to the relatively large interval in comparison to the duration of the program, one or more programs can be scheduled during this interval. If desired, multiple repeating programs can be interleaved by appropriately configuring the respective interval properties.

Accordingly, the number of schedule items required to reproduce EPG data equivalent to that shown in FIG. 10 has been reduced from five to three.

Figure 13:
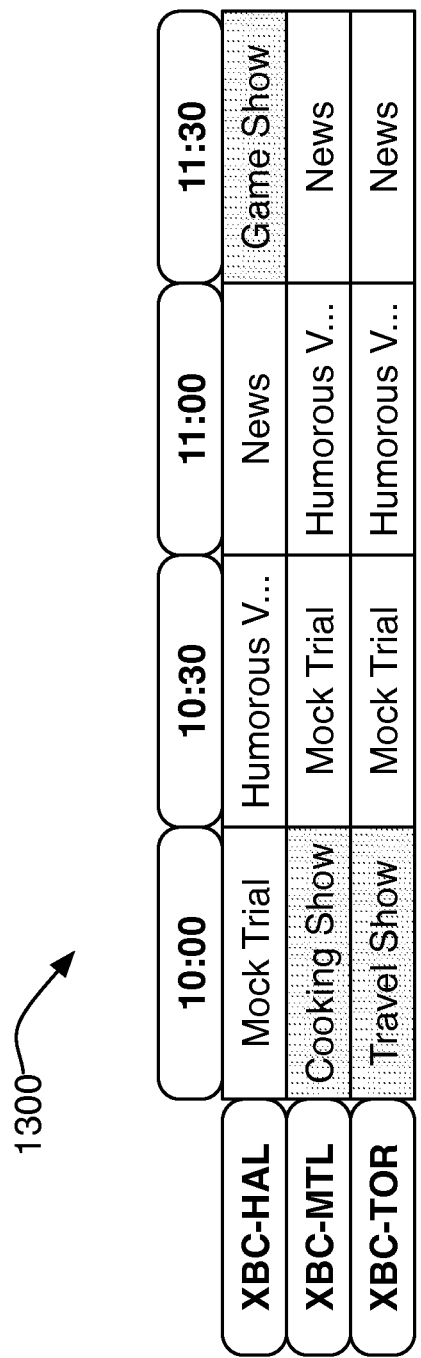
FIG. 13 illustrates an example schedule excerpt containing a repeat channels recurrence pattern.

Referring now to FIG. 13, there is shown a example schedule excerpt containing a repeat channels recurrence pattern. Schedule excerpt 1300 is a fragment of EPG data describing the program schedule for three channels (XBC-HAL, XBC-MTL and XBC-TOR) between the times of 10:00 and 12:00 on a single day. Each channel airs the same three programs ("Mock Trial", "Humorous Videos", and "News") in succession at some point during the schedule. However, channels XBC-MTL and XBC-TOR schedule the string of programs thirty minutes later than XBC-HAL. The channels may be network affiliates located in different cities and may also be located in different time zones.

Referring now to FIG. 14, there are shown example schedule items corresponding to the schedule excerpt of FIG. 13. The schedule items may be excerpts of EPG data. Schedule items 1410-1, 1410-2 and 1410-3 correspond to the timeslots for the XBC-HAL channel; schedule items 1412-1, 1412-2 and 1412-3 correspond to the timeslots for the XBC-MTL channel; and schedule items 1414-1, 1414-2 and 1414-3 correspond to the timeslots for the XBC-TOR channel.

For example, schedule item 1410-1 has properties indicating that the item is associated with: the XBC-HAL channel, the date of March 23, the time of day of 10:00 and the program "Mock Trial". Additional properties (not shown) may also be present. Each of the remaining schedule items has similar properties corresponding to the program, channel, day and timeslot.

In some cases, the schedule items may be grouped into one or more pages (not shown).

Considerable redundancies exist in the schedule item properties. For example, each schedule item for channels XBC-MTL and XBC-TOR is similar to those for XBC-HAL, with the exception of the time of day property and channel property.

Figure 15:
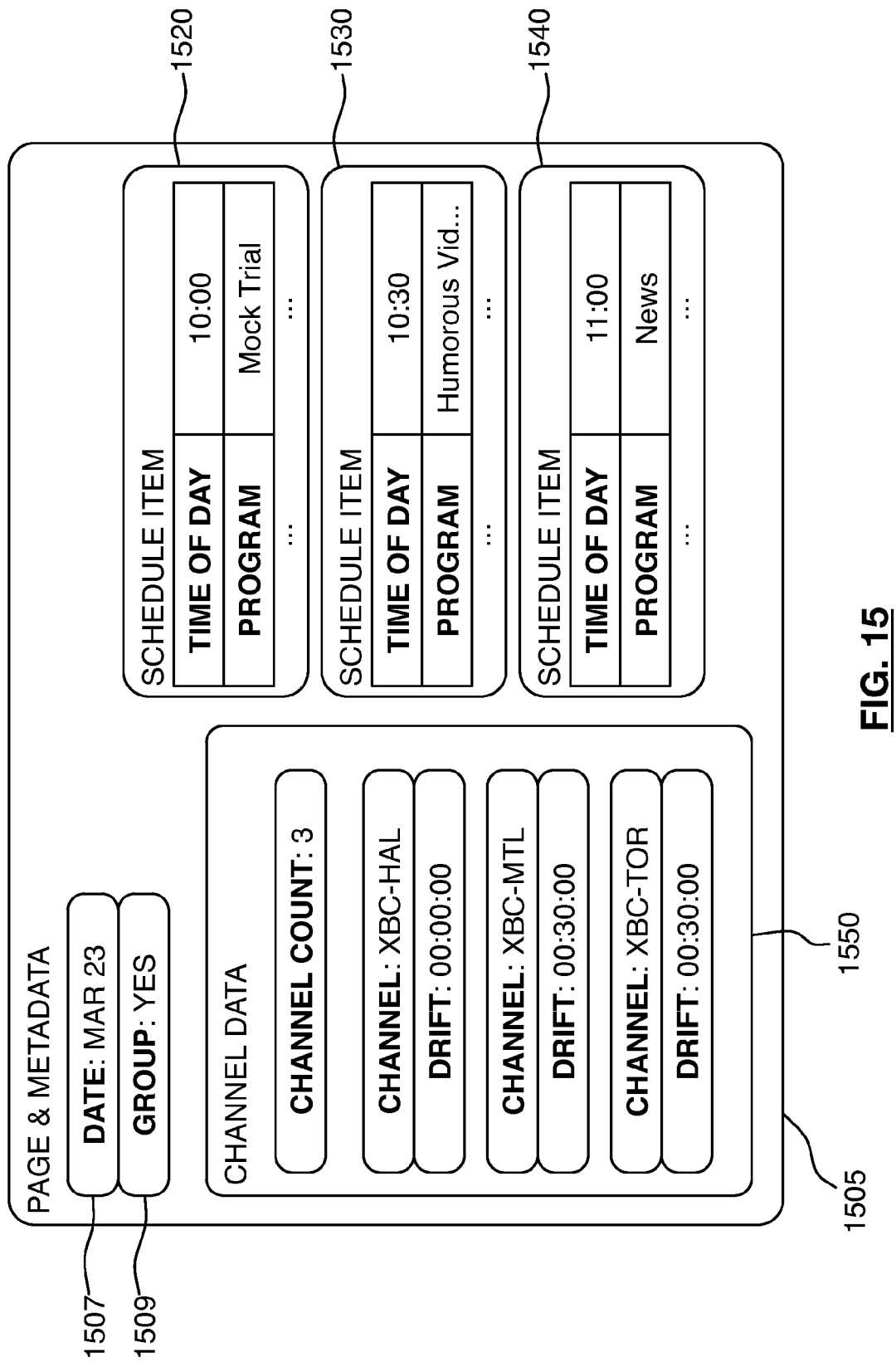
FIG. 15 illustrates example optimized schedule pages corresponding to the schedule items of FIG. 14.

Referring now to FIG. 15, there is shown an example optimized schedule page corresponding to the schedule items of FIG. 14. Redundancies in schedule item properties have been identified and removed, while additional metadata properties have been added to facilitate generating complete schedule information.

Optimized schedule page 1505 comprises three optimized schedule items 1520, 1530 and 1540 and metadata properties representing data common to the schedule items contained in the page. For example, optimized schedule page 1505 includes a date property 1507 and a group property 1509. In addition, channel data 1550 is provided, which provides a channel count property and three channel identifier and time offset properties.

In particular, channel data 1550 indicates that there are three channels: a first channel has a channel identifier of XBC-HAL and a time offset of zero; a second channel has a channel identifier of XBC-MTL and a time offset of thirty minutes; and a third channel has a channel identifier of XBC-TOR and a time offset of thirty minutes.

Optimized schedule item 1520 includes a time of day property for indicating the start time of the program and a program property identifying the program. When the item appears in the schedule for channel XBC-HAL, the item will appear at time 10:00, since the time offset associated with channel XBC-HAL is zero. However, when the item appears in the schedule for channels XBC-MTL and XBC-TOR, the item will appear at time 10:30, since the time offset associated with those channels is thirty minutes.

Accordingly, the number of schedule items required to reproduce EPG data equivalent to that shown in FIG. 14 has been reduced from nine to three.

Figure 16:
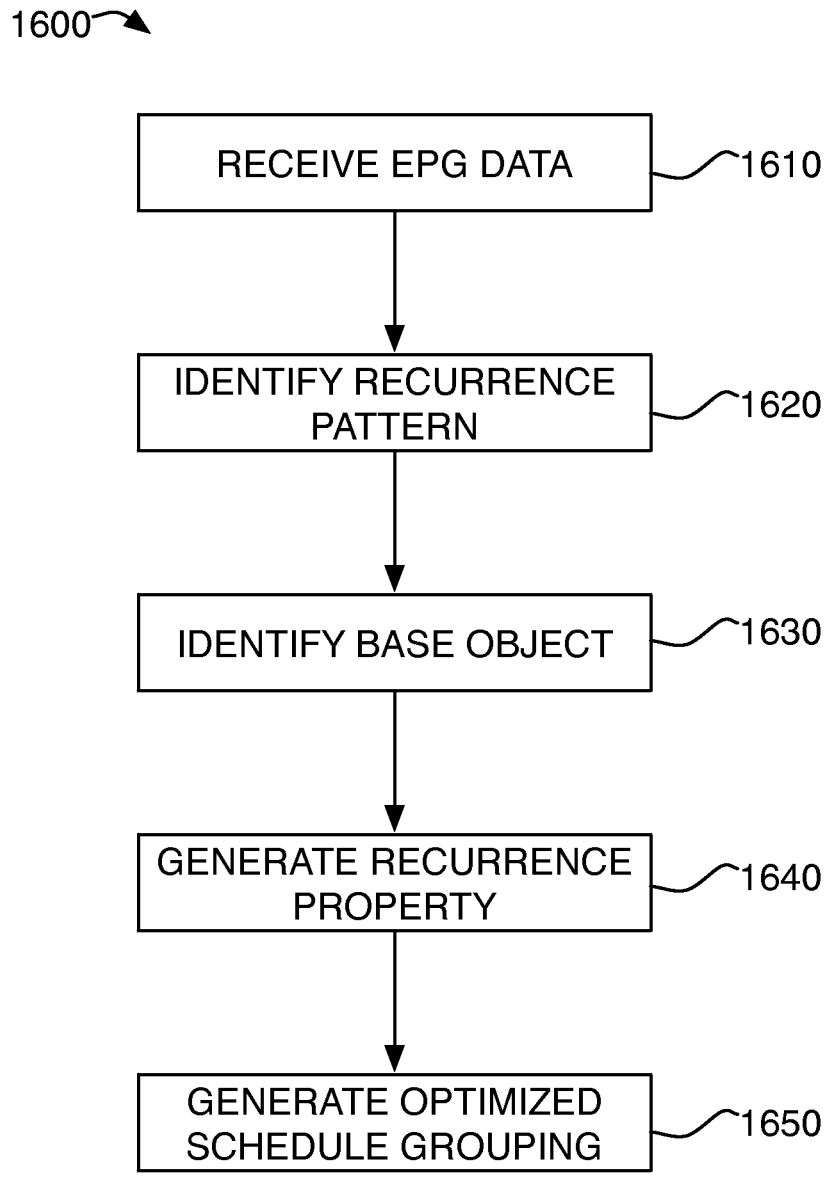
FIG. 16 illustrates an example flow diagram of an EPG optimization process.

Referring now to FIG. 16, there is shown an example flow diagram of an EPG optimization process. Optimization process 1600 may be performed by an optimization system, which may be EPG server 130, content server 120 or any other suitable device or system (not shown). Optimization process 1600 may implement one or more of the optimization techniques described and illustrated herein.

At step 1610, the system can receive EPG data including a plurality of schedule objects. The schedule objects may be schedule items, schedule pages or some combination thereof. The EPG data may be unoptimized, or it may already have undergone at least one round of optimization. In some cases, optimized data may be altered, thus introducing new redundancies into the EPG data. In other cases, there may be multiple rounds of optimization, each dedicated to identifying a particular recurrence pattern.

At step 1620, a recurrence pattern may be identified in at least a subset of the schedule objects by the system, for example by a processor of the system. The recurrence pattern may be identified using an approximation which works in three passes. The first pass identifies similarities in the programming between channels by comparing programming for a given channel to every other channel, including a drift of +/−6 hours in half hour increments. The channels are grouped based on a predetermined tolerance, such as for example 80%. Then, the schedules are sorted primarily by channel(s), secondarily by program, and thirdly by air date/time. This sorting facilitates identification of runs in the data. Then, the data is sorted primarily by channel(s), secondarily by air time, thirdly by program and fourthly by air date. This facilitates identification of re-occurrences. Alternatively, the recurrence patterns may be identified by any other suitable pattern-matching techniques. The recurrence pattern may be based on an association between one or more properties of the schedule objects, and may be one or more of the "repeat days", "repeat runs", "repeat channels", other recurrence patterns, or some combination thereof.

At step 1630, a base object may be identified, which may contain one or more properties that are common to the schedule objects that share the identified recurrence pattern. A recurrence pattern property can be generated at step 1640 to identify the recurrence pattern property. In some cases, the recurrence pattern property may contain the redundant data that is to be omitted from the optimized items. In some cases, the recurrence pattern property may contain an indication of how to generate the redundant data. For example, the recurrence pattern property may indicate that an item is to be repeated on several days of the week. The recurrence pattern property may be associated with the base schedule object in a suitable manner, for example in the form of metadata. Metadata may take the form of schedule page metadata, or schedule item properties, or both.

At step 1650, an optimized schedule grouping can be generated, which comprises at least the base schedule object and the metadata that includes an indication of the recurrence pattern property. The optimized schedule grouping may be an optimized schedule page. In some cases, the optimized schedule grouping may comprise a single optimized schedule item and the metadata.

Once the optimized schedule grouping is generated, the system can replace the original, unoptimized schedule objects in the EPG data with optimized schedule objects. Accordingly, the system may repeat the optimization process to identify additional recurrence patterns. Once optimization is complete, the system may store or transmit the optimized EPG data as needed.

With the bandwidth savings achieved through use of the described optimized techniques, the optimized EPG data can be transmitted more efficiently. Alternatively, additional detail about the scheduled programming (e.g., artist information, detailed descriptions, etc.) may be added to the EPG data without increasing the file size.

Moreover, because the optimized EPG data is not compressed using a compression algorithm such as LZW, it remains possible to easily update the optimized EPG data without decompressing and recompressing the data. Specifically, optimization of EPG data without using compression algorithms, such as LZW, permits the use of a given subset of EPG data. Compression with LZW would require the terminal device to download the entire dataset in order to decompress and then access the EPG data within. EPG data optimized in accordance with the embodiments of the present invention permits use of a subset of the data without the need to download the entire dataset. This in turn permits the transmission of EPG data to the terminal device in small subsets, and those subsets may be useable by the terminal device immediately. For example, a terminal device may take two hours to download the entire EPG data file compressed using LZW, and would then be required to decompress and process it before being able to use the EPG data. While the terminal device may take 2 hours to download the entire data set of EPG data optimized in accordance with embodiments of the present invention, the terminal device is able to process each small subset of optimized EPG data as it is received. Consequently, the terminal device may be capable of displaying EPG data in as little as 5 minutes, instead of requiring the entire two hours of download time before any of the downloaded EPG data can be displayed. Alternatively, further bandwidth efficiency can be achieved by applying compression such as LZW to the optimized EPG data.

It will be appreciated that various embodiments may comprise one or more special purpose or general purpose computers or servers, each of which may include, but are not limited to, one or more processors, memories, storage devices, input/output devices and network interfaces. Likewise, the terms 'computer' and 'server' may be interchangeable in accordance with the above description. Furthermore, embodiments may be implemented as computer software instructions stored on a computer readable medium and executed in memory by processors on one or more of the computers or servers contemplated above. Although embodiments have been described as separate components, it will be understood that various components could be combined into a single computer or server, or implemented across multiple computers or servers all connected via a communications medium such as the Internet.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method of optimizing EPG data at a server for provision to a terminal device, the method comprising:
   receiving the EPG data, wherein the EPG data comprises a plurality of schedule objects;
   identifying, using a processor, a recurrence pattern in a subset of the schedule objects, wherein identifying the recurrence pattern comprises:
      comparing schedule objects of the plurality associated with a selected channel to schedule objects of the plurality associated with a plurality of other channels, allowing for a drift of up to six hours in half hour increments;
      sorting the plurality of schedule objects primarily by channel, secondarily by program and thirdly by air date and time; and
      sorting the plurality of schedule objects primarily by channel, secondarily by air time, thirdly by program and fourthly by air date; and
   based on the recurrence pattern, identifying at least one base schedule object in the subset of schedule objects, wherein the at least one base schedule object comprises properties that are common to two or more of the schedule objects in the subset;
   generating at least one recurrence pattern property for the at least one base schedule object, the at least one recurrence pattern property usable to regenerate the one or more properties of two or more of the schedule objects in the subset, based on the recurrence pattern and the at least one base schedule object;
   generating an optimized schedule grouping comprising the at least one base schedule object and a metadata object, wherein the metadata object comprises the at least one recurrence pattern property;
   replacing the subset of schedule objects in the EPG data with the optimized schedule grouping to generate optimized EPG data; and
   providing the optimized EPG data to the terminal device.

2. The method of claim 1, wherein the recurrence pattern comprises repetition of the subset of schedule objects on one or more days of the week.

3. The method of claim 2, wherein the recurrence pattern property identifies days of the week on which to repeat the subset of schedule objects.

4. The method of claim 1, wherein the recurrence pattern comprises repetition of the subset of schedule objects for a selected number of repetitions.

5. The method of claim 4, wherein the selected number of repetitions are separated by a repetition interval.

6. The method of claim 4 or claim 5, wherein the recurrence pattern property identifies the selected number of repetitions.

7. The method of claim 5, wherein the recurrence pattern property further identifies the repetition interval.

8. The method of claim 1, wherein the recurrence pattern comprises repetition of the subset of schedule objects on at least one channel.

9. The method of claim 8, wherein the recurrence pattern further comprises repetition of the subset of schedule objects with at least one time offset.

10. The method of claim 8, wherein the recurrence pattern property identifies at least one channel corresponding to the subset of schedule objects.

11. The method of claim 8 or claim 9, wherein the recurrence pattern property further identifies the time offset.

12. The method of claim 1, wherein the metadata object is a header.

13. The method of claim 1, further comprising determining an optimization type based on the identified recurrence pattern.

14. An EPG data optimization system comprising:
   a terminal device; and
   a server, the server comprising:
      a communication interface for receiving the EPG data, wherein the EPG data comprises a plurality of schedule objects;
      a memory for storing the EPG data; and
      a processor, the processor configured to:
         identify a recurrence pattern in a subset of the schedule objects, by:
            comparing schedule objects of the plurality associated with a selected channel to schedule objects of the plurality associated with a plurality of other channels, allowing for a drift of up to six hours in half hour increments;
            sorting the plurality of schedule objects primarily by channel, secondarily by program and thirdly by air date and time; and
            sorting the plurality of schedule objects primarily by channel, secondarily by air time, thirdly by program and fourthly by air date; and
         based on the recurrence pattern, identify at least one base schedule object in the subset of schedule objects, wherein the at least one base schedule object comprises properties that are common to two or more of the schedule objects in the subset;
         generate at least one recurrence pattern property for the at least one base schedule object, the at least one recurrence pattern property usable to regenerate the one or more properties of two or more of the schedule objects in the subset, based on the recurrence pattern and the at least one base schedule object;
         generate an optimized schedule grouping comprising the at least one base schedule object and a metadata object, wherein the metadata object comprises the at least one recurrence pattern property;
         replace the subset of schedule objects in the EPG data with the optimized schedule grouping to generate optimized EPG data; and
         provide the optimized EPG data to the terminal device.

15. The system of claim 14, wherein the recurrence pattern comprises repetition of the subset of schedule objects on one or more days of the week.

16. The system of claim 15, wherein the recurrence pattern property identifies days of the week on which to repeat the subset of schedule objects.

17. The system of claim 14, wherein the recurrence pattern comprises repetition of the subset of schedule objects for a selected number of repetitions.

18. The system of claim 17, wherein the selected number of repetitions are separated by a repetition interval.

19. The system of claim 17 or claim 18, wherein the recurrence pattern property identifies the selected number of repetitions.

20. The system of claim 18, wherein the recurrence pattern property further identifies the repetition interval.

21. The system of claim 14, wherein the recurrence pattern comprises repetition of the subset of schedule objects on at least one channel.

22. The system of claim 21, wherein the recurrence pattern further comprises repetition of the subset of schedule objects with at least one time offset.

23. The system of claim 21, wherein the recurrence pattern property identifies at least one channel corresponding to the subset of schedule objects.

24. The system of claim 21 or claim 22, wherein the recurrence pattern property further identifies the time offset.

25. The system of claim 14, wherein the metadata object is a header.

26. The system of claim 14, wherein the processor is further configured to determine an optimization type based on the identified recurrence pattern.

27. A non-transitory computer-readable medium having stored thereon instructions executable by a computer processor, which, when executed, cause the computer to perform a method of optimizing EPG data at a server for provision to a terminal device, the method comprising:

receiving the EPG data, wherein the EPG data comprises a plurality of schedule objects;

identifying, using a processor, a recurrence pattern in a subset of the schedule objects, wherein identifying the recurrence pattern comprises:

comparing schedule objects of the plurality associated with a selected channel to schedule objects of the plurality associated with a plurality of other channels, allowing for a drift of up to six hours in half hour increments;

sorting the plurality of schedule objects primarily by channel, secondarily by program and thirdly by air date and time; and sorting the plurality of schedule objects primarily by channel, secondarily by air time, thirdly by program and fourthly by air date; and based on the recurrence pattern, identifying at least one base schedule object in the subset of schedule objects, wherein the at least one base schedule object comprises properties that are common to two or more of the schedule objects in the subset;

generating at least one recurrence pattern property for the at least one base schedule object, the at least one recurrence pattern property usable to regenerate the one or more properties of two or more of the schedule objects in the subset, based on the recurrence pattern and the at least one base schedule object;

generating an optimized schedule grouping comprising the at least one base schedule object and a metadata object, wherein the metadata object comprises the at least one recurrence pattern property;

replacing the subset of schedule objects in the EPG data with the optimized schedule grouping to generate optimized EPG data; and providing the optimized EPG data to the terminal device.

\* \* \* \* \*